L. O. ALLEN

Sewing-Machine Caster.

No. 6,269. Reissued Feb. 2, 1875.

WITNESSES:

H. K. Morrell

J. G. Weymouth

INVENTOR.

Levi O. Allen

THE GRAPHIC CO. PHOTO-LITH. 39 & 41 PARK PLACE, N.Y.

UNITED STATES PATENT OFFICE.

LEVI O. ALLEN, OF GARDINER, MAINE, ASSIGNOR TO JAMES F. ALMY AND JEFFERSON B. BRACKETT, OF SALEM, MASSACHUSETTS.

IMPROVEMENT IN SEWING-MACHINE CASTERS.

Specification forming part of Letters Patent No. 81,454, dated August 25 1868; reissue No. 6,269, dated February 2, 1875; application filed April 10, 1874.

*To all whom it may concern:*

Figure 1:
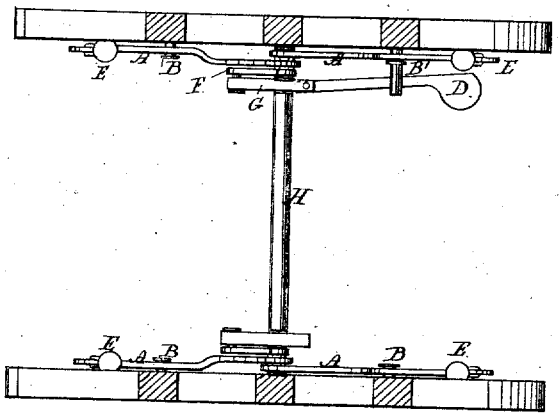
Figure 2:
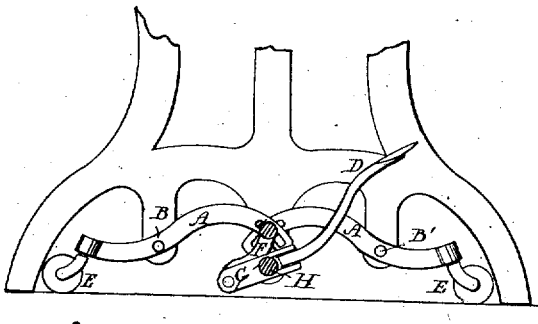

Be it known that I, LEVI O. ALLEN, of Gardiner, in the county of Kennebec and State of Maine, have invented an Improved Caster for Sewing-Machines, &c., of which the following is a specification:

In the drawings, Figure 1 is a plan view of my improved caster, as applied to a sewing-machine table. Fig. 2 is a side view of the same, and Fig. 3 is a similar side view to Fig 2, but with the caster in another position.

Figure 3:
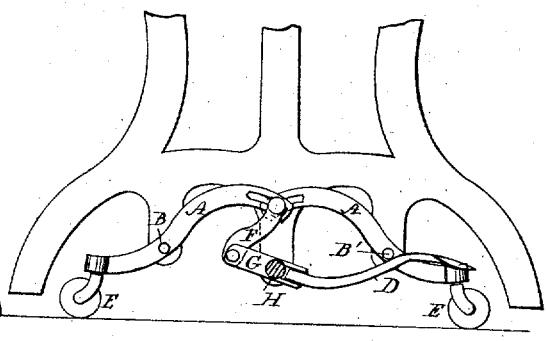

The casters E are each so secured to a lever, A, each of which levers is so pivoted at B to the frame of the machine that by moving the levers on their pivots the frame is lifted to bring its weight upon the casters, as shown in Fig. 3; or lowered to release the casters of its weight, as shown in Fig. 2.

This mode of attaching the casters to the frame, namely, by means of levers pivoted to the frame and guided at their inner ends by a common axis moved by a lever, constitutes the main feature of the invention.

I am aware that casters have been attached to a frame by means of a lever pivoted to the frame, and a slotted standard pivoted to the lever and held to the frame by means of a guide-pin passing through this slot and fast to the frame, as fully described in patent No. 19,755 to Charles Croley, dated March 30, 1858. I disclaim, therefore, the use of pivoted levers, except where their pivots form the only connection between the casters and frame.

The other features of the invention relate to the means for operating these pivoted levers.

A treadle-lever, D, is arranged at one side of the frame, and connected by the link F to the caster-levers next it; it is also rigidly connected to the cross-shaft H, and through this cross-shaft actuates the other caster-levers. By this arrangement of parts both sides can be operated at once by means of a single treadle-lever, D, and without any other motion than can easily be accomplished by the foot the whole set of casters can be operated very readily and quickly. This, however, of itself is not new. The peculiar arrangement for accomplishing this constitutes the second feature of the invention.

The third feature of the invention relates to locking the treadle-lever after the weight of the frame is thrown upon the casters; and consists in the following arrangement of parts: The treadle-lever is so constructed that it can have a slight lateral play, and a pin, B′, (which in this case is a prolongation of one of the pivots B,) is so arranged upon the frame that the treadle-lever D can independently be moved sidewise under it, and there be held by it until it is again moved sidewise from under it. This lateral play is provided for by making the treadle-lever in two parts, D and G, pivoted together, so as to be relatively rigid in a vertical plane, but not rigid in a horizontal plane.

Having thus described my invention, what I claim, and desire to secure by Letters Patent, is—

1. The combination, with the frame, of the casters E and levers A, pivoted to the frame, said levers being guided at their inner ends by a common axis and moved by a lever, and arranged together as described, so that the pivots B form the only connection between the casters and the frame.

2. The combination, with the frame, the casters E, and the levers A, pivoted to the frame, of the connections F G and cross-shaft H, all arranged together substantially as described, so that the whole set of casters is operated by moving the single treadle-lever, as specified.

3. The combination of the treadle-lever D G, pin B′, and frame, when arranged together substantially as described, so that the treadle-lever may be held or released, when depressed, by moving it laterally, as specified.

LEVI O. ALLEN.

Witnesses:

H. K. MORRELL,

J. G. WEYMOUTH.